Figure 1:
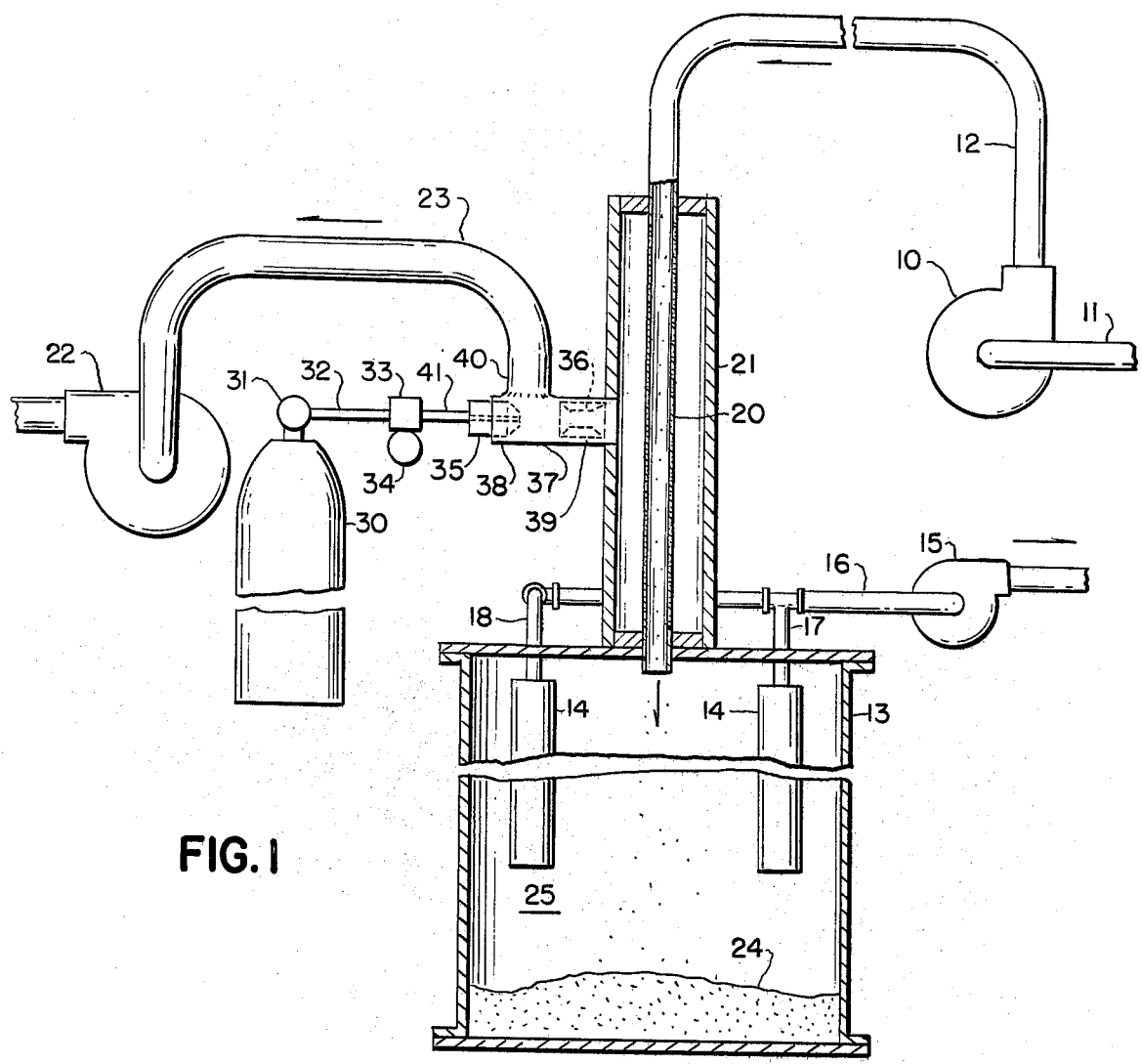
Figure 2:
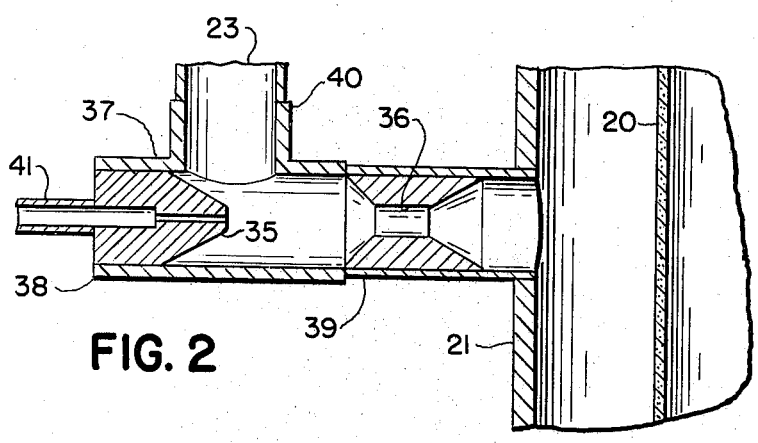
Figure 3:
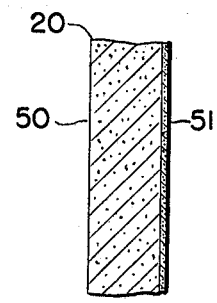

United States Patent [19]

Mott

[11] 4,083,607
[45] Apr. 11, 1978

[54] GAS TRANSPORT SYSTEM FOR POWDERS

[76] Inventor: Lambert H. Mott, c/o Mott Metallurgical Corporation Farmington Industrial Park, Farmington, Conn. 06032

[21] Appl. No.: 683,378

[22] Filed: May 5, 1976

[51] Int. Cl.² .................. B65G 53/60; B01D 35/02
[52] U.S. Cl. ........................... 302/59; 55/272; 55/302; 55/350; 55/467; 55/482; 55/487; 55/DIG. 32; 141/67; 141/90; 141/286; 141/392; 423/261
[58] Field of Search ............... 55/467, 468, DIG. 32, 55/309, 310, 383, 361, 418, 385 R, 482, 485, 487, 272, 293, 302, 343, 350, 72, 68; 141/286, 392, 59, 67, 90; 302/21, 59; 423/261

[56] References Cited

U.S. PATENT DOCUMENTS

| | | | |
|---|---|---|---|
| 1,597,272 | 8/1926 | Finkhousen | 55/310 |
| 2,804,938 | 9/1957 | Oppenheimer et al. | 55/482 X |
| 3,080,694 | 3/1963 | Smith | 55/293 X |
| 3,169,038 | 2/1965 | Pendleton | 55/468 X |
| 3,214,221 | 10/1965 | Finnegan | 141/67 X |
| 3,235,327 | 2/1966 | Blundell et al. | 423/261 |
| 3,258,041 | 6/1966 | Lau | 141/286 X |
| 3,358,425 | 12/1967 | Burnham, Sr. | 55/468 X |
| 3,384,134 | 5/1968 | Hillerns | 141/286 X |
| 3,601,955 | 8/1971 | Ferri | 141/67 X |
| 3,693,672 | 9/1972 | Hiland | 141/90 X |
| 3,788,368 | 1/1974 | Geng et al. | 141/67 |
| 3,845,193 | 10/1974 | Littlechild et al. | 423/261 |
| 3,978,194 | 8/1976 | Knudsen et al. | 423/261 |

FOREIGN PATENT DOCUMENTS

201,218  10/1967  U.S.S.R. ............... 302/59

*Primary Examiner*—Frank W. Lutter
*Assistant Examiner*—Kathleen J. Prunner
*Attorney, Agent, or Firm*—Peter L. Tailer

[57] ABSTRACT

A gas transport system for powder has a delivery pipe having an end portion of porous material having a pore size smaller than the particles of the powder. The porous end portion is surrounded by a jacket in which a vacuum is drawn to draw off transport gas and reduce filter capacity which would otherwise be required to remove it. Pulses of pressure are periodically introduced into the jacket to clear particles from the inside of the porous end portion. The vacuum is drawn in the jacket through a vacuum line containing a constriction through which a nozzle discharges high pressure gas at intervals to provide the pulses of pressure in the jacket. This system is particularly effective when used in the production of uranium oxide.

1 Claim, 3 Drawing Figures

GAS TRANSPORT SYSTEM FOR POWDERS

BACKGROUND OF THE INVENTION

1. Field of the Invention

This invention relates to the air slide delivery of powders of all types and to the transport of particulate matter by a gas.

2. Description of the Prior Art

Air slide systems with filters to remove transport air from the vessel to which the particulate matter is delivered are old. These systems often require costly "bag house" filters to handle the large volumes of transport air involved.

SUMMARY OF THE INVENTION

An air slide or gas transport system for particulate matter discharges into a vessel from which the transport gas is removed through filters. The discharge tube has a vertical end portion of porous material surrounded by a jacket in which a lower pressure is drawn. The lower pressure in the jacket draws off transport gas through the porous end portion of the delivery tube reducing the load on the filters and thus required filter capacity. At least the inner wall of the porous end portion has a pore size smaller than the particulate matter being transported so that only transport gas is withdrawn through the jacket.

The rush of gas and particulate matter through the porous discharge portion prevents the caking of powder therein. At periodic intervals a high pressure pulse is introduced into the jacket to blow back through the porous end portion and clear its pores. The pulses of pressure may be provided by directing a jet of high pressure gas back through a constriction in a vacuum line leading from the jacket.

The use of the porous discharge portion is far more efficient in the removal of transport gas than conventional filters in the vessel to which the powder is delivered as the velocity of the particles passing through the tubular porous end portion prevents them from impinging directly on the porous wall. Thus for its area and a given differential or driving pressure, the porous end portion removes transport gas more efficiently than any equivalent conventional filter.

In the production of uranium oxide by the burning of uranium hexafluoride the size of the filters are limited by the volume determined by the critical mass of uranium that can exist within any given reactor. Conventional filtration practice limits air flow to 4 to 6 cubic feet per minute per square foot of filter material for good filter practice if a blow back system to periodically clear the filters is to be effective. Thus the production rate of the process is limited by filter capacity. The use of the system of this invention permits a substantial increase in the production of uranium oxide without increasing the load on the filters and with no change in the critical volume of the reactors themselves.

BRIEF DESCRIPTION OF THE DRAWING

FIG. 1 is an elevational view, partly in section and with central portions of elements broken away, of a gas transport system for powder;

FIG. 2 is a vertical section through the end of a vacuum line connected with a "T" to a fragment of a jacket, the "T" containing a jet for high pressure gas and a constriction for intermittently pressurizing the jacket; and FIG. 3 is a section through a fragment of a porous wall of an end portion of a delivery tube.

DESCRIPTION OF THE PREFERRED EMBODIMENT

As shown in FIG. 1, a delivery turbine 10 draws powder and air or any other suitable transport gas through pipe 11 and blows it through delivery pipe 12 into tank 13. Tank 13 contains filter 14 connected to a vacuum pump 15 by tubes 16, 17 and 18. The forementioned elements are well known in the gas transport of particulate matter.

An end portion 20 of pipe 12 is of porous material surrounded by a jacket 21. End portion 20 is best disposed vertically. Vacuum turbine 22 draws a vacuum through vacuum line 23 in jacket 21. As powder 24 and its transporting gas 25 reach tank 13, the transporting gas 25 is drawn off through filters 14 leaving the particulate matter 24 in container 13. In conventional air slide or other gas transport systems, filter capacity to remove all the air or other transport gas is required.

In the practice of this invention, the vacuum jacket 21 draws off transport gas 25 through the porous end portion 20 reducing the required filter capacity in tank 13 as much as fifty percent. The pore size of portion 20 should be small enough to prohibit passage of any of the particulate matter 24 being transported. Although caking of powder 24 in portion 20 is inhibited as cake is knocked away by high speed passing particles as it is formed, eventually the pores of the portion 20 may tend to clog.

A source of gas 30 under pressure, such as a tank of $CO_2$, delivers gas through a pressure reducing valve 31, line 32, and solenoid valve 33. Valve 33 is periodically opened for short intervals by a timer 34 to direct gas through tube 41 to nozzle 35 to blast through constriction 36 in vacuum line 23. This arrangement is best accomplished using a "T" fitting 37 with the nozzle 35 and constriction 36 in or beyond the arms 38 and 39 of the "T" 37 which has line 23 connected to its leg 40. Each short duration blast of gas through constriction 36 draws additional gas back through line 23 to pressurize jacket 21 and clear the pores of porous end portion 20.

As shown in FIG. 3, portion 20 is best formed with a coarse, large pore outer layer 50 of a pore size larger than the particulate matter or powder 24 being transported and a thin inner layer 51 with a sufficiently small pore size to prevent passage of the powder 24 being transported. This construction permits clearing pressure bursts in jacket 21 to reach the inner surface layer 51 more readily to more effectively clear it with a shock effect. Outer layer 50 mainly serves to support layer 51. Layer 50 may be of rolled screen wire coated with a thin layer 51 of sintered porous metal.

The application of this invention to the production of uranium oxide can greatly increase the production of existing facilities. It can also greatly reduce the high cost of operation of "bag house" filters in the air delivery of powder products.

In one test of this invention, powdered coal was air transported and the required conventional delivery air filter capacity was reduced up to 30 percent. A vacuum of five inches of water was maintained in jacket 21 surrounding a porous end portion 20 of 1.0 inch I.D., 1.25 inches O.D., and 25 inches long having a pore size of 10 microns. The pores of portion 20 were cleared every 20 seconds by three 0.5 second air blasts at 100 p.s.i. during an interval of 3 seconds.

I claim:

1. In a gas transport system for particulate matter having a tank, a delivery pipe, means blowing gas and particulate matter being transported thereby through said pipe into said tank, and filter means within said tank through which at least some transport gas is removed from said tank; the improvement comprising, in combination, an end portion of porous metal of said delivery pipe, said end portion having a thin inner layer with a pore size smaller than the particulate matter being transported and an outer layer having a pore size larger than the particulate matter being transported, said outer layer surrounding and supporting said thin inner layer, said end portion extending vertically downward into said tank, a jacket disposed about said porous end portion, a vacuum turbine, a "T" fitting having a first arm connected to said jacket, a second arm, and a leg, a constriction in said first arm, a vacuum line connected between said vacuum turbine and said leg, said vacuum turbine drawing a vacuum in said jacket through said leg, said first arm, and said constriction and thereby drawing at least some transporting gas outward through said inner and outer layers of said end portion, a nozzle in said second arm of said "T" fitting directed toward said constriction in said first arm, a source of gas under pressure, and valve means incorporating a timer and being connected between said source of gas under pressure and said nozzle periodically releasing pulses of gas from said source of gas under pressure to blast from said nozzle through said constriction against flow therethrough momentarily pressurizing said jacket causing momentary inward flow through said porous end portion clearing the pores of said inner layer of said porous end portion.

* * * * *